Patented May 4, 1943

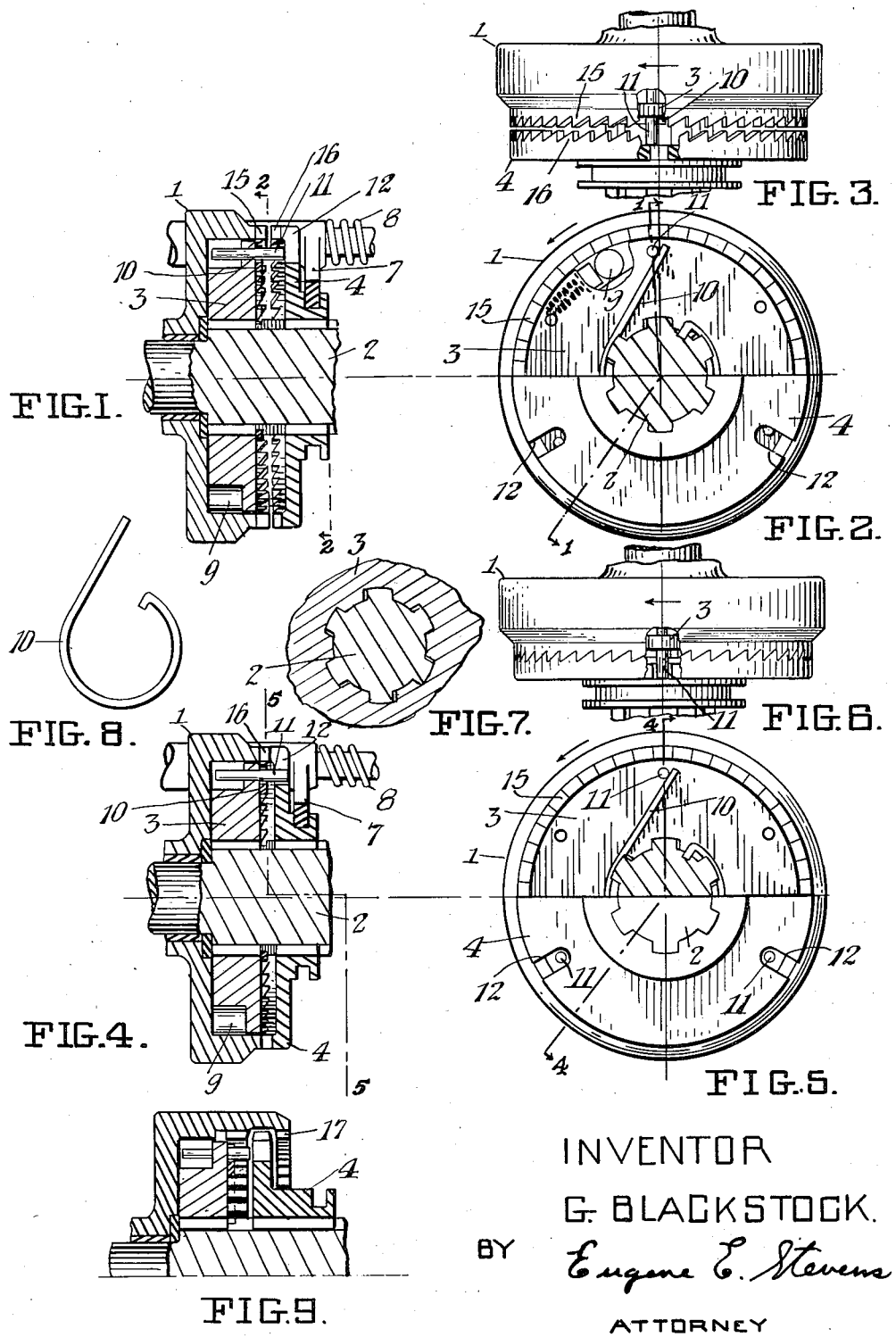

2,318,283

UNITED STATES PATENT OFFICE 2,318,283

SELF-LOCKING FREEWHEEL CLUTCH

Gibbs Blackstock, Toronto, Ontario, Canada

Application February 10, 1941, Serial No. 378,268

7 Claims. (Cl. 192—44)

My invention relates to improvements in clutches of the free-wheel-and-lock type which, by being self-locking on synchronization, can act as a semi-automatic or automatic clutch, able to transmit torque one way when unlocked and both ways when locked.

It is primarily but not exclusively intended for use in various ways with automobile transmissions, whether automatic or not, with the usual engine clutch or with hydraulic drive, and can act as a high or a low gear coupling or as a separate free-wheel unit. Its interest in connection with a hydraulic drive lies in the capacity for locking itself on synchronization without attention and without clashing or scraping. Essentially it is a free wheel unit with a spring pressed tooth or dog lock of some kind and a guard device which holds the lock open during over-running and lets it close on synchronization. One of the torque transmitting parts of the free wheel connection (preferably the cam with respect to the splined shaft carrying it) has a small angular play and is held to one side by spring or friction or both, while the free wheel part over-runs, and in this position it holds the guard so that the lock cannot close; when opposite turning effect is applied this part is moved through a small angle and this moves the guard to let the lock engage. In a more general form of the clutch there may be an additional set of teeth so that the operator can at will lock the unit without interference from the guard device.

Fig. 1 shows a longitudinal section of one form of the clutch taken on line 1—1 Fig. 2, the parts being in the disengaged position.

Fig. 2 is a sectional view taken on the line 2—2 Fig. 1, parts being broken away.

Fig. 3 is a plan or side view broken away and in section to exhibit the parts in the unlocked or disengaged position.

Figs. 4, 5 and 6 are respectively similar views to Figs. 1, 2 and 3, Fig. 4 being taken on line 4—4 Fig. 5, and Fig. 5 on line 5—5 Fig. 4 and showing the members in the engaged or locked position.

Fig. 7 is an enlarged fragmentary detail of the splined connection between the cam and carrying shaft which allows the cam small angular play on the shaft.

Fig. 8 is a detail view of the combined torsion spring and snap ring.

Fig. 9 is a sectional view of a general form of clutch having an extra set of engaging teeth.

The direction of normal rotation is indicated by arrows.

While the form shown in Fig. 9 is the more complete or general, that illustrated in Figs. 1–8 lends itself more easily to diagrammatic explanation and so will be described now.

The form shown in Figs. 1–8 has a backward acting or "anti-free-wheel" and may be considered as the top gear coupling in a transmission.

In Figs. 1, 2 and 3 the driving part or shell 1 is free to advance with the arrow with respect to the driven shaft 2 which carries the cam 3 forming the free-wheel connection and the sliding engaging member 4 sliding on its splines. The member 4 is pressed to the left by the spring 8 acting on the fork 7. The internal annular face of the shell 1 slips over the free-wheel rollers 9, one only of which is shown, which rollers are inserted between it and the wedging faces of the cam member 3. The cam member 3 has a small angular play on the shaft 2 as clearly indicated in Figs. 2 and 7 and is now turned forward with the arrow as far as it can go by friction and the torsion spring 10 which presses on one of the guard studs 11 on the cam. There are preferably three studs 11 and these studs, as shown in Figs. 2 and 3, are not quite in line with the corresponding slots or recesses 12 in the sliding member 4, holding such unit 4 so that the teeth 15 on part 1 and 16 on the member 4 are clear of each other. This would be the condition when the top gear is released allowing the drive to be taken by any lower gear train.

Now, suppose the driving part 1 is retarded, as by closing the throttle. When the turning effect is reversed the rollers 9 will grip and turn the cam 3 back through a small angle and this will bring the guard studs 11 in line with the slots 12 in the engaging member 4, which can slide but not turn on the shaft 2. The engaging member 4 will be moved to the left by spring 8 as illustrated in Figs. 1 and 4 or up in Figs. 3 and 6 and bring the teeth into engagement. When thus engaged the clutch transmits direct driving torque with the arrow through the teeth, their shape being such as is clear from Fig. 3, and back drag torque the other way through the rollers.

It is disengaged by moving the engaging member 4 to the right clear of the guard studs by any means, such as a connection to the clutch pedal in a car, and letting the driving part 1 advance with the arrow, as by opening the throttle. The torsion spring 10 turns the cam 3 slightly with the arrow as in Figs. 2 and 3 so that the guard studs again hold the engaging or locking member in the open position.

Any suitable means for disengaging the clutch may be used, pedal, manual or automatic, such as a governor adjusted to press the fork 7 to the right at low speeds and to let the spring 8 act at high speeds. With this type of clutch in a motor car a disengaging connection to the brake pedal can give a sort of governor action, making the operation essentially automatic. If the car is slowed by the foot brake to such a speed that the driving part 1, driven by the idling engine, is faster than the shaft 2, while the teeth are disengaged, the cam and studs 11 will be turned forward out of line with the slots 12 and prevent the re-engagement, the clutch is thus released automatically.

The more general or complete form of Fig. 9 can act just as the Fig. 1 type as far as engaging or disengaging (with reference to teeth 15 and 16) is concerned, the more conventional clutch teeth shown in Fig. 9 being formed to act essentially as the ratchet teeth in Fig. 3. By sliding the member 4 to the right the teeth 17 can be engaged without interference from the guard studs at any time the operator wishes.

If we consider the shaft 2 to be the driver and the shell 1 the driven part, the figures will show a clutch with a forward acting free-wheel, drive will be transmitted through the rollers and back drag through the teeth, if engaged. The engaging will take place when the drive shaft 2 tends to overtake the shell 1, the internal action will be the same, e. g., engagement being effected by a clockwise motion of the cam 3 relative to the shaft 2.

This would be the case when the clutch is used as a free-wheel unit at the rear of a transmission, for which use it is particularly adapted in conjunction with a hydraulic drive replacing the usual engine clutch. With a free-wheel in this position it is necessary to lock it when reverse torque is to be transmitted. Here the shaft 2 would tend to go backwards, or clockwise and would not give that small relative turn of the cam in the direction required to open the guard device, hence the need for the "hand lock" to lock the teeth 17 as in Fig. 9.

With a forward acting free-wheel the clutch can also be used in the low gear drive in a transmission, the lock is used only when a positive connection is required. Here again it is particularly intended for use with the hydraulic drive. I think it is obvious that it can also be used where one main part such as the shell 1 is stationary, as with planetary gearing, as a reaction clutch. When the part 1 is a stationary part it may have internal cam faces instead of an annulus and the rotary part, such as the part 3, could have the annular face, all without making any difference to the operation of the clutch.

The angular play of the cam on its splines need not be large, the only essential is that it should be of a decidedly higher order of magnitude than that of the engaging member 4 (which in the ideal case would be zero), the amount of play required is really a function of the degree of accuracy that is to go into the making of the machine. It is recommended that some form of resilient or non-metallic material be incorporated somewhere in the torque train to deaden any knock which might cause a Brinell effect on the cam faces. I think it apparent that the play need not be in any one place, the place shown seems to be the best and simplest, but the essential thing is that it should be somewhere in the free-wheel course of torque transmission so that there is somewhere the small angular "give" when the rollers grip, as required to operate the guard device.

While the roller and cam is the best form of free-wheel, there is no reason that there should not be used any other kind of free-wheel, functionally the requirement is that it should let the part 1 turn freely with the arrow but grip and turn the part 3 when the turning effect is reversed, and that it should be a torque transmitting means.

The ratchet teeth shown in Fig. 2 can transmit torque one way only and this makes their disengagement easy when the load is on the rollers. If the more conventional kind of clutch teeth are used I recommend that their design and fit be such that they act similarly, or that their fit be not so tight that they can jam with the rollers or be difficult to disengage, if they do this or transmit torque both ways they may give trouble in assemblies where there is no engine clutch by opening which the load can be eased. Subject to this any tooth form may be used, even a pawl in conjunction with ratchet teeth, for it can be easily seen that the guard studs can control a pawl in the same way as they do the sliding lock.

In addition to the controls already mentioned, the lock and fork may be subject to further ones deemed necessary. In a motor car, for instance, connections may be made to the gear lever so that in one setting, it works a catch to prevent the engagement, in another it merely does not interfere with the engagement, and motion to a third position may be used to engage the lock with the teeth 17 in Fig. 9.

What I claim as my invention is:

1. A clutch of free wheel and lock type comprising a first main part forming part of a free-wheel, a second main part, a member having small angular free displacement between a first and second position on the second main part, elements between such angularly displaceable member and the first main part adapted to transmit torque therebetween in one direction only and in doing so to turn the displaceable member from the first to the second position, a member on the second main part engageable with the first main part to transmit torque when engaged in the opposite direction, means for preventing such engagement when the displaceable member is in its first position and to allow of such engagement when the displaceable member is in its second position and resilient means for effecting such engagement when allowed by the position of the displaceable member.

2. In a clutch of free wheel and lock type, a first main part forming part of a free-wheel and provided with clutch teeth, a second main part, a free-wheel member having a small angular free displacement between a first and second position on the second main part, elements between such angularly displaceable member and the first main part adapted to transmit torque therebetween in one direction only and in doing so to turn the displaceable member from the first to the second position, a light torsion spring for turning the free-wheel member yieldingly in the direction of free relative rotation of the first main part, a lock member on the second main part engageable by resilient pressure with the first main part to transmit torque when engaged in the opposite direction to that in which the above elements do so, that is when moving from the second to the first position, means for preventing such engagement when the displaceable member is in the first position and to allow of such engagement when the displaceable member is in the second position.

3. In a clutch of free-wheel and lock type, driving and driven main parts, a driving part and clutch teeth and an annulus on the driving part, a sliding lock member rotating with the driven part and having teeth coacting with those on the driving part, and resilient means for effecting their engagement, a cam on the driven part having a small angle of free displacement therewith, free wheel rollers interposed between the cam and the annulus to transmit torque in one direction only, a torsion spring between the cam and the driven part to turn the cam yieldingly in the direction of free rotation of the driving part, means actuated by the displacement of the cam for holding the teeth of the driving part and the coacting teeth out of mesh when the cam is turned in said direction of free rotation and to let them engage when the cam is turned in the other direction, and means for disengaging the teeth.

4. In a clutch unit of free-wheel and lock type, a carrier member, locking means adapted to transmit torque to such member in one direction, free-wheel means of one way type to transmit torque thereto in the opposite direction and including two torque transmitting parts, one of which is connected to the carrier member, they having small angular free displacement relative to each other between a first and second position and being adapted to take the first position when the unit is running free and the second position when an opposite turning effect is applied, means for preventing the locking means engaging when the unit is running free and while the displaceable parts are in the first position and to allow them to engage when the parts move towards the second position, and means for effecting their engagement, and additional locking means controllable by an operator and acting independently of the above mentioned preventing means.

5. In a clutch of free wheel and lock type, a first main part forming part of a free-wheel and provided with clutch teeth, a second main part, a free-wheel member having a small angular free displacement between a first and second position on the second main part, elements between such angularly displaceable member and the first main part adapted to transmit torque therebetween in one direction only and in doing so turn the displaceable member from the first to the second position, a light torsion spring for turning the free wheel member yieldingly in the direction of free relative rotation of the first main part, a lock member on the second main part engageable by resilient pressure with the first main part to transmit torque when engaged in the opposite direction to that in which the said elements do so, means for preventing such engagement when the displaceable member is in the first position and to allow of such engagement when the displaceable member is in the second position, and an additional set of clutch teeth on the first main part engageable by the locking member, engagement of such teeth not being subject to the aforesaid preventing means.

6. A clutch of free-wheel and lock type having two main parts and connections for transmitting torque between them comprising a free-wheel connection adapted to transmit torque in one direction, a locking connection adapted to transmit torque in the other direction when locked, and means to effect its locking, two torque transmitting elements in the free-wheel connection having a small angular free displacement relatively to each other between a first and a second position and moved to take the first position when the free wheel connection is running free and the second when opposite turning effect is applied to it, a detent (or guard device) coacting with the two torque transmitting elements to prevent the locking when the elements are in the first position and to allow it when they are in the second.

7. A clutch of free-wheel and lock type having two main parts and connections for transmitting torque between them comprising a free-wheel connection adapted to transmit torque in one direction, a locking connection adapted to transmit torque in the other direction and including a spring pressed movable locking member, two torque transmitting elements in the free-wheel connection having a small angular free displacement relatively to each other between a first and a second position and moved to take the first position when the free wheel connection is running free and the second when the opposite turning effect is applied to it, a detent (or guard device) coacting with the two torque transmitting elements to hold the locking connection open when the said elements are in the first position and to allow it to close by spring action when they are in the second.

GIBBS BLACKSTOCK.